(12) United States Patent
Wu et al.

(10) Patent No.: US 12,174,041 B2
(45) Date of Patent: Dec. 24, 2024

(54) ROAD UPDATING METHOD AND APPARATUS FOR ELECTRONIC MAP, COMPUTER DEVICE, AND STORAGE MEDIUM

(71) Applicant: TENCENT TECHNOLOGY (SHENZHEN) COMPANY LTD, Guangdong (CN)

(72) Inventors: Xiao Yuan Wu, Shenzhen (CN); Yuejin Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 424 days.

(21) Appl. No.: 17/679,736

(22) Filed: Feb. 24, 2022

(65) Prior Publication Data

US 2022/0178714 A1    Jun. 9, 2022

Related U.S. Application Data

(63) Continuation of application No. PCT/CN2021/074626, filed on Feb. 1, 2021.

(30) Foreign Application Priority Data

Apr. 13, 2020   (CN) .................... 202010283806.1

(51) Int. Cl.
   *G01C 21/00*   (2006.01)
   *G01C 21/34*   (2006.01)
(52) U.S. Cl.
   CPC ....... *G01C 21/387* (2020.08); *G01C 21/3461* (2013.01); *G01C 21/3896* (2020.08)

(58) Field of Classification Search
   CPC .............. G01C 21/387; G01C 21/3896; G01C 21/3822; G01C 21/3461; G01C 21/32
   See application file for complete search history.

(56) References Cited

U.S. PATENT DOCUMENTS

2006/0184321 A1*   8/2006   Kawakami ............. G01C 21/28
                                                                    701/411
2006/0217879 A1*   9/2006   Ikeuchi .............. G01C 21/3844
                                                                    701/409
(Continued)

FOREIGN PATENT DOCUMENTS

CN            1842692 A        10/2006
CN        101290230 A   *   10/2008
(Continued)

OTHER PUBLICATIONS

CN 101290230 A—Machine Translation (Year: 2008).*
(Continued)

*Primary Examiner* — Dino Kujundzic
(74) *Attorney, Agent, or Firm* — Banner & Witcoff, Ltd.

(57) ABSTRACT

A road updating method for an electronic map is provided. The method includes acquiring a target road in the electronic map, the target road being at least one of an intrinsic upper road of an overpass or an intrinsic lower road of the overpass, acquiring a target node of the target road, the target node being at least one of a first node of the target road or a last node of the target road, acquiring visible points within a preset range of the target node, determining path lengths between the visible points and the target node, determining an extended road of the target node according to the path lengths between the visible points and the target node, and updating the electronic map based on the extended road.

20 Claims, 8 Drawing Sheets

(56) References Cited

U.S. PATENT DOCUMENTS

| | | | |
|---|---|---|---|
| 2009/0248758 A1* | 10/2009 | Sawai | G01C 21/3878 |
| | | | 707/999.203 |
| 2010/0030460 A1 | 2/2010 | Sawai et al. | |
| 2010/0114474 A1 | 5/2010 | Suganuma et al. | |
| 2013/0328861 A1 | 12/2013 | Arikan et al. | |
| 2013/0328863 A1* | 12/2013 | Pirwani | G06T 11/20 |
| | | | 345/441 |
| 2014/0362082 A1* | 12/2014 | Schpok | G06T 17/05 |
| | | | 345/427 |
| 2017/0284812 A1 | 10/2017 | Kim et al. | |
| 2020/0033138 A1* | 1/2020 | Okoba | G01C 21/30 |

FOREIGN PATENT DOCUMENTS

| | | | |
|---|---|---|---|
| CN | 101788300 A | | 7/2010 |
| CN | 102226700 A | * | 10/2011 |
| CN | 104567885 A | | 4/2015 |
| CN | 105547309 A | | 5/2016 |
| CN | 107560629 A | | 1/2018 |
| CN | 110617826 A | | 12/2019 |
| CN | 111504334 A | | 8/2020 |

OTHER PUBLICATIONS

CN 102226700 A—Machine Translation (Year: 2011).*
International Search Report for PCT/CN2021/074626 dated May 8, 2021 [PCT/ISA/210].
Written Opinion for PCT/CN2021/074626 dated May 8, 2021 [PCT/ISA/237].
Chinese Office Action for CN 2020102838061 dated Apr. 13, 2020.

* cited by examiner

ROAD UPDATING METHOD AND APPARATUS FOR ELECTRONIC MAP, COMPUTER DEVICE, AND STORAGE MEDIUM

CROSS REFERENCE TO RELATED APPLICATION(S)

This application is a continuation application of International Application No. PCT/CN2021/074626, filed on Feb. 1, 2021, which claims priority to Chinese Patent Application No. 202010283806.1, filed with the China National Intellectual Property Administration on Apr. 13, 2020, the entire contents of which are incorporated by reference herein.

FIELD

The disclosure relates generally to the field of information technologies, and in particular, to a road updating method and apparatus for an electronic map, a computer device, and a storage medium.

BACKGROUND

With the development of information technologies, people use electronic maps to find destinations and plan paths. Traditional map data includes very little upper road data and lower road data of an overpass in an electronic map, and includes partial data of two roads above and below an overlapping point. Overpass data in the conventional electronic map is generally manually collected, and the manual collection of the actual overpass road data requires a lot of time and costs.

SUMMARY

Provided are a road updating method and apparatus for an electronic map, a computer device, and a storage medium.

In accordance with an aspect of the disclosure, a road updating method for an electronic map, performed by at least one processor, may include acquiring a target road in the electronic map, the target road being at least one of an intrinsic upper road of an overpass or an intrinsic lower road of the overpass, acquiring a target node of the target road, the target node being at least one of a first node of the target road or a last node of the target road, acquiring visible points within a preset range of the target node, determining path lengths between the visible points and the target node, determining an extended road of the target node according to the path lengths between the visible points and the target node, and updating the electronic map based on the extended road.

In accordance with an aspect of the disclosure, an apparatus may include at least one memory configured to store computer program code, at least one processor configured to access said computer program code and operate as instructed by said computer program code, said computer program code including first acquiring code configured to cause the at least one processor to acquire a target road in the electronic map, the target road being at least one of an intrinsic upper road of an overpass or an intrinsic lower road of the overpass, second acquiring code configured to cause the at least one processor to acquire a target node of the target road, the target node being at least one of a first node of the target road or a last node of the target road, third acquiring code configured to cause the at least one processor to acquire visible points within a preset range of the target node, first determining code configured to cause the at least one processor to determine path lengths between the visible points and the target node, second determining code configured to cause the at least one processor to determine an extended road of the target node according to the path lengths between the visible points and the target node, first updating code configured to cause the at least one processor to update the electronic map based on the extended road.

In accordance with an aspect of the disclosure, a non-transitory computer-readable storage medium may store computer instructions that, when executed by at least one processor of a device, cause the at least one processor to acquire a target road in the electronic map, the target road being at least one of an intrinsic upper road of an overpass or an intrinsic lower road of the overpass, acquire a target node of the target road, the target node being at least one of a first node of the target road or a last node of the target road, acquire visible points within a preset range of the target node, determine path lengths between the visible points and the target node, determine an extended road of the target node according to the path lengths between the visible points and the target node, and update the electronic map based on the extended road.

In an embodiment, the determining a road angle between the second extended road and the first extended road includes determining a road angle between a polyline formed by the first number of thinned points and the first extended road, an extending direction of the polyline being same as an extending direction of the first extended road.

A road updating apparatus for an electronic map is provided. The apparatus includes a target road acquisition module, configured to acquire a target road in the electronic map, the target road being at least one of an intrinsic upper road or an intrinsic lower road of an overpass, a target node acquisition module, configured to acquire a target node of the target road, the target node being at least one of a first node or a last node of the target road, a path length acquisition module, configured to acquire visible points within a preset range of the target node, and determine path lengths between the visible points and the target node; and an updating module, configured to determine an extended road of the target node according to the path lengths between the visible points and the target node, and update the electronic map based on the extended road.

A computer device is provided, including a memory and a processor, the memory storing a computer program, the processor, when executing the computer program, implementing the following operations: acquiring a target road in the electronic map, the target road being at least one of an intrinsic upper road or an intrinsic lower road of an overpass, acquiring a target node of the target road, the target node being at least one of a first node or a last node of the target road, acquiring visible points within a preset range of the target node, and determining path lengths between the visible points and the target node, and determining an extended road of the target node according to the path lengths between the visible points and the target node, and updating the electronic map based on the extended road.

A computer-readable storage medium is provided, storing a computer program, the computer program, when executed by a processor, implementing the following operations: acquiring a target road in the electronic map, the target road being at least one of an intrinsic upper road or an intrinsic lower road of an overpass, acquiring a target node of the target road, the target node being at least one of a first node or a last node of the target road, acquiring visible points within a preset range of the target node, and determining path lengths between the visible points and the target node, and determining an extended road of the target node according to the path lengths between the visible points and the target node, and updating the electronic map based on the extended road.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DESCRIPTION OF EMBODIMENTS

Details of one or more embodiments of this disclosure are provided in the accompanying drawings and descriptions below. Other features, objectives, and advantages of this disclosure become apparent with reference to the specification, accompanying drawings, and claims.

To help understand this disclosure, this disclosure is described more comprehensively below with reference to the related accompanying drawings. Exemplary embodiments of this disclosure are provided in the accompanying drawings. However, this disclosure may be implemented in many different forms, and is not limited to the embodiments described in this disclosure. On the contrary, the embodiments are provided to make understanding of the disclosed content of this disclosure more comprehensive.

Figure 1:
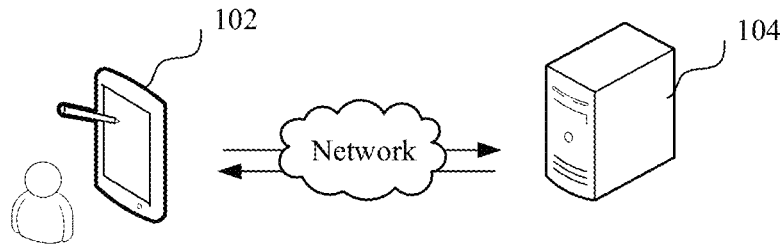
FIG. 1 is a diagram of an application environment of a road updating method for an electronic map according to an embodiment.

FIG. 1 is a diagram of an application environment of a road updating method for an electronic map according to an embodiment. The road updating method for an electronic map provided in this disclosure may be applied to an application environment shown in FIG. 1. A terminal 102 communicates with a server 104 by using a network. The terminal 102 may be, but not limited to, a personal computer, a notebook computer, a smartphone, a tablet computer, and a portable wearable device. The server 104 may be implemented by an independent server or a server cluster including a plurality of servers. In this embodiment, the terminal 102 may acquire electronic map data stored in the server 104, and then the terminal 102 determines a target road in the electronic map. The target road is at least one of an intrinsic upper road or an intrinsic lower road of an overpass. Next, the terminal 102 acquires a target node of the target road. The target node is at least one of a first node or a last node of the target road. The terminal 102 acquires visible points within a preset range of the target node, and determines path lengths between the visible points and the target node. Next, the terminal 102 determines an extended road of the target node according to the path lengths between the visible points and the target node, and updates the electronic map based on the extended road. Next, the terminal 102 transmits the updated electronic map to the server 104 for storage.

In an embodiment, applying the road updating method for an electronic map to path planning includes the following steps:

The terminal 102 acquires the electronic map, and acquires a corresponding road topology network based on the electronic map.

The terminal 102 acquires an intrinsic upper road and an intrinsic lower road of an overpass in the road topology network, and acquires a first node and a last node of the intrinsic upper road.

The terminal 102 acquires visible points within a preset range of the first node, and determines path lengths between the visible points and the first node.

The terminal 102 determines a minimum value of the path lengths between the visible points and the first node, and uses, as an extended road of the first node, a path between the visible point corresponding to the minimum value and the first node.

The terminal 102 acquires visible points within a preset range of the last node of the intrinsic upper road, and determines path lengths between the visible points and the last node.

The terminal 102 determines a minimum value of the path lengths between the visible points and the last node; and uses, as an extended road of the last node, a path between the visible point corresponding to the minimum value and the last node.

The terminal 102 determines a last node of the extended road. In a case that the last node of the extended road is a fork, the terminal determines a first road set forming the fork.

In a case that the first road set includes a ramp road and the target road is not a ramp road, the terminal 102 determines a next extended road based on an extending direction of the extended road.

In a case that the target road is a circular road and the last node of the extended road is a fork, the terminal 102 determines a second road set forming the fork.

The terminal 102 uses a non-circular road in the second road set as the next extended road of the extended road.

Next, the terminal 102 acquires a first extended road corresponding to the intrinsic upper road according to each extended road of the intrinsic upper road, and completes the mining of the extended roads of the intrinsic upper road of the overpass.

Next, the terminal 102 performs mining of the extended roads of the intrinsic lower road of the overpass.

The terminal 102 acquires a first node and a last node of the intrinsic lower road, determines a first pedal distance between the first node of the intrinsic lower road of the overpass and a corresponding intrinsic upper road, and determines a second pedal distance between the last node of the intrinsic lower road and the intrinsic upper road of the overpass.

In a case that at least one of the first pedal distance or the second pedal distance is less than or equal to a distance threshold, the terminal 102 uses, as a target node from which the intrinsic lower road extends, a node corresponding to the pedal distance less than or equal to the distance threshold.

In a case that the first pedal distance and the second pedal distance are both greater than the distance threshold, the terminal 102 determines a minimum value of the first pedal distance and the second pedal distance, and uses, as the target node from which the intrinsic lower road extends, a node corresponding to the minimum value.

The terminal 102 acquires visible points within a preset range of the target node from which the intrinsic lower road extends, and determines path lengths between the visible points and the target node.

The terminal 102 determines a minimum value of the path lengths between the visible points and the target node, and uses, as an extended road of the target node from which the intrinsic lower road extends, a path between the visible point corresponding to the minimum value and the target node.

The terminal 102 determines a last node of the extended road. In a case that the last node of the extended road is a fork, the terminal 102 determines a first road set forming the fork.

In a case that the first road set includes a ramp road and the target road is not a ramp road, the terminal 102 determines a next extended road based on an extending direction of the extended road.

Next, the terminal 102 acquires a second extended road corresponding to the intrinsic lower road according to each extended road of the intrinsic lower road, and completes the mining of the extended roads of the intrinsic lower road of the overpass.

Then, the terminal 102 verifies whether the extended road of the intrinsic upper road and the extended road of the intrinsic lower road of the overpass are true and accurate, including the following steps:

The terminal 102 acquires a first number of thinned points from the second extended road, and determines, from the first number of thinned points, second thinned points allowed to be projected onto the first extended road.

The terminal 102 determines pedal distances between the second thinned points and the first extended road, and determines a number of the second thinned points at pedal distances satisfying a distance threshold.

The terminal 102 determines a road angle between a polyline formed by the first number of thinned points and the first extended road, an extending direction of the polyline being same as an extending direction of the first extended road.

In a case that the number of the second thinned points at the pedal distances satisfying the distance threshold satisfies a number threshold and the road angle satisfies an angle threshold, the terminal 102 determines that the first extended road is parallel to the second extended road.

In a case that the first extended road is parallel to the second extended road, the terminal 102 uses the parallel first extended road as a target extended road corresponding to the intrinsic upper road and uses the parallel second extended road as a target extended road corresponding to the intrinsic lower road.

The terminal 102 deletes extended roads corresponding to the intrinsic upper road and the intrinsic lower road other than the target extended roads.

The terminal 102 updates the intrinsic upper road and the intrinsic lower road respectively based on the target extended road corresponding to the intrinsic upper road and the target extended road corresponding to the intrinsic lower road, to obtain an updated electronic map and an updated road topology network.

Next, the terminal 102 performs path navigation planning based on the updated electronic map, including the following steps:

The terminal 102 acquires an origin and a destination, and acquires road data between the origin and the destination based on the updated electronic map and vehicle information.

The terminal 102 determines, according to the road data and between the origin and the destination the vehicle information, a path to the destination spending least time.

In a case that an overpass exists in a preset range of a current position, the terminal 102 displays upper road data and lower road data of the overpass, and prompts a user through voice.

In a case that the current position is at the upper road or the lower road of the overpass, the terminal 102 determines a path length between the current position and the last node of the upper road or the lower road and an estimated time that is spent, and broadcasts the path length and the estimated time that is spent through voice.

The terminal 102 acquires road data between the current position and the destination and vehicle information based on the updated electronic map every preset time.

The terminal 102 determines, based on the road data between the current position and the destination and vehicle information, whether a user deviates from a planned path, and adjusts the planned path in a case that the user yaws.

By applying the road updating method for an electronic map to path navigation planning, path planning may be performed for the user based on the updated road data. Upper road data and lower road data of the overpass are added to the electronic map, such that the data of the electronic map is more complete, thereby providing more effective information for the path planning, and achieving more accurate path planning. In a case that the current position of the user is at the upper road or the lower road of the overpass, the terminal may remind the user in real time of a path length and a required time to the end node, and effectively determines whether the user deviates from the planned path, thereby improving the flexibility and the accuracy of the path planning.

Figure 2:
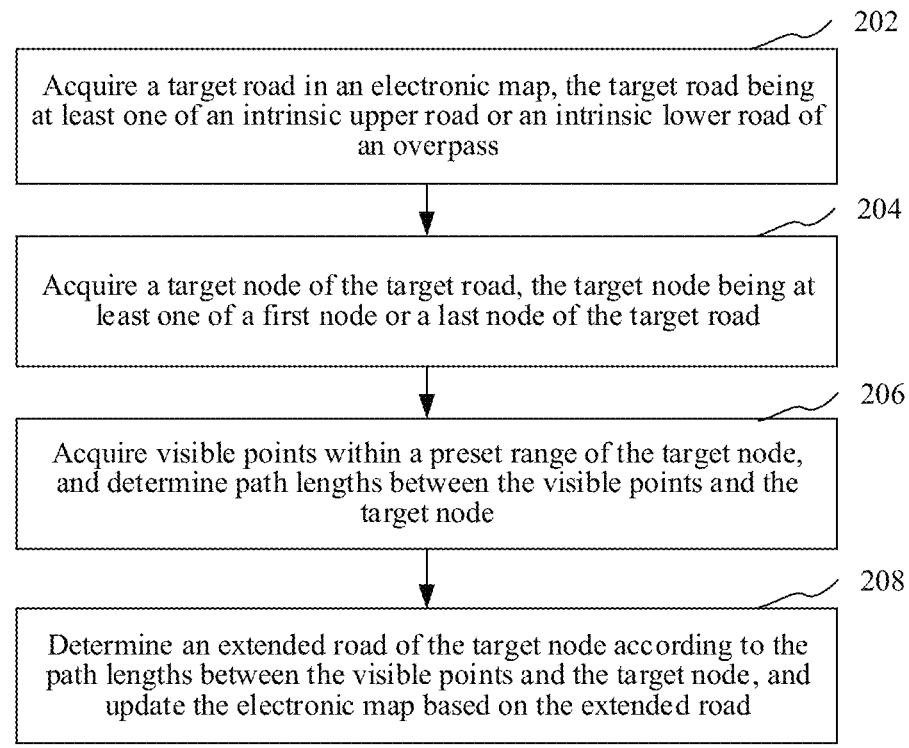
FIG. 2 is a flowchart of a road updating method for an electronic map according to an embodiment.

FIG. 2 is a flowchart of a road updating method for an electronic map according to an embodiment. In an embodiment, as shown in FIG. 2, a road updating method for an electronic map is provided. For example, the method is applied to the terminal in FIG. 1. The method includes the following operations:

In operation 202, the system acquires a target road in the electronic map, the target road being at least one of an intrinsic upper road or an intrinsic lower road of an overpass.

The intrinsic upper road may refer to data of an intrinsic upper road of the overpass, including a road number, overlapping point coordinates, a corresponding road level, and an upper data number. The intrinsic lower road may refer to data of an intrinsic lower road of the overpass, including a road number, overlapping point coordinates, a corresponding road level, and a lower data number.

Figure 3:
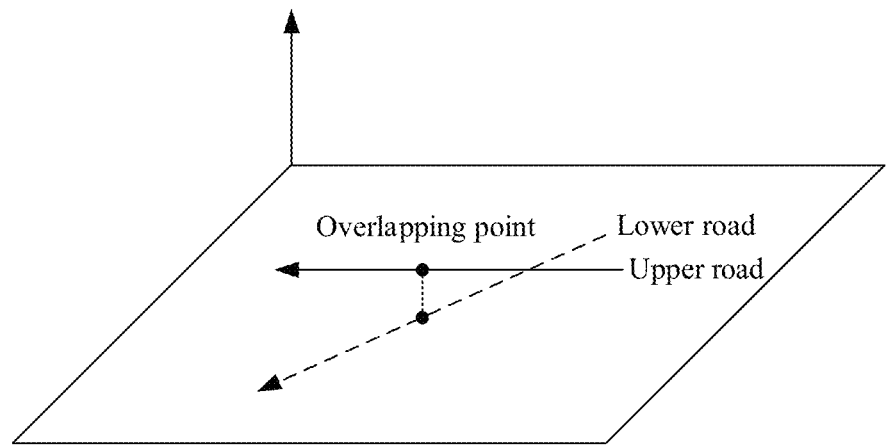
FIG. 3 is a diagram of overlapping between an upper road and a lower road in a three-dimensional space according to an embodiment.

FIG. 3 is a diagram of overlapping between an upper road and a lower road in a three-dimensional space according to an embodiment. An overlapping point may refer to a pseudo intersection point between the upper road and the lower road, that is, an intersection of the two roads in a two-dimensional plane without a height. However, in a three-dimensional space including a height, the two roads do not actually intersect. Instead, a specific spatial height distance exists between the two roads. The two lines intersect in a top view. It may be understood that the upper road and the lower road in an overlapping relationship are not connected. FIG. 3 shows an example of overlapping between an upper road and a lower road in a three-dimensional space.

Specifically, the terminal may acquire original road data from the electronic map, and acquire a road topology network based on the original road data. Next, the terminal determines an overpass in the road topology network and at least one of an intrinsic upper road and an intrinsic lower road corresponding to the overpass. The intrinsic upper road corresponding to the overpass is used as a target road, or the intrinsic lower road corresponding to the overpass is used as the target road, or the intrinsic upper road and the intrinsic lower road corresponding to the overpass are both used as the target road.

In operation 204, the system acquires a target node of the target road, the target node being at least one of a first node or a last node of the target road.

The target node is the first node of the target road or the last node of the target road, or includes both of the first node and the last node of the target road. The first node is a start point of the target road, and the last node is an end point of the target road. It may be understood that the first node and the last node are relative to each other.

Specifically, after acquiring the target road, the terminal may determine the start point and the end point of the target road, to acquire the first node and the last node of the target road. The terminal may use the first node of the target road as the target node and the last node as the target node, or may use both of the first node and the last node as the target node.

Further, in a case that the target road is the intrinsic upper road corresponding to the overpass, the target node is at least one of the first node or the last node of the intrinsic upper road. In a case that the target road is the intrinsic lower road corresponding to the overpass, the target node is at least one of the first node or the last node of the intrinsic lower road. In a case that the target road is the intrinsic upper road and the intrinsic lower road corresponding to the overpass, the target node is at least one of the first node or the last node of the intrinsic upper road and at least one of the first node or the last node of the intrinsic lower road.

In operation 206, the system acquires visible points within a preset range of the target node, and determine path lengths between the visible points and the target node.

The visible points are positions present in the electronic map or positions displayed in the road topology network.

Specifically, after determining the target node, the terminal may determine the visible points in the road topology network within the preset range of the target node. The terminal may determine the path length between each visible point and the target node. The preset range is a preset radius range or a preset length range. That is to say, the target node is used as the center to acquire the visible points within the preset radius range. Alternatively, the target node is used as a reference to acquire the visible points within the preset length range.

Further, the terminal may acquire a preset number of visible points within the preset range, and determine a path length between each visible point in the preset number of visible points and the target node.

It may be understood that the visible points in the preset range are visible points in a specific range other than the visible points present on the target road, but not the visible points present on the target road. For example, 4 visible points, that is, A, B, C, and D are present on the target road, and 10 visible points are present outside the target road. The points A and D are respectively the first node and the last node of the target road. In this case, the visible points determined by the terminal do not include the points A, B, C, and D. The point A or D is used as a reference to acquire a visible point that satisfies the preset range from the 10 visible points.

In operation 208, the system determines an extended road of the target node according to the path lengths between the visible points and the target node, and update the electronic map based on the extended road.

The extended road is a road not displayed and marked in the original electronic map and the original road topology network.

Specifically, after the terminal calculates the path length between each visible point and the target node, the terminal may add the extended road to the electronic map and the road topology network, thereby completing the update of the electronic map.

In the above road updating method for an electronic map, the target road in the electronic map is acquired, the target road being at least one of an intrinsic upper road or an intrinsic lower road of an overpass, the target node of the target road is acquired, the target node being at least one of the first node or the last node of the target road, the visible points within the preset range of the target node are acquired, the path lengths between the visible points and the target node are determined, the extended road of the target node is determined according to the path lengths between the visible points and the target node, and the electronic map is updated based on the extended road. In this way, manual collection of the road data of the overpass is omitted, saving the time and the collection costs. In addition, more road data information of the upper road and the lower road of the overpass are added to the electronic map, such that the electronic map has more information and is more consistent with an actual road status.

In an embodiment, determining the extended road of the target node according to the path lengths between the visible points and the target node includes: determining a minimum value of the path lengths between the visible points and the target node, and using, as the extended road of the target node, a path between the visible point corresponding to the minimum value and the target node.

Specifically, after calculating the path length between each visible point and the target node, the terminal may rank the path lengths. The terminal acquires the visible point corresponding to the minimum path length from the ranked path lengths, and uses a path corresponding to the minimum path length as the extended road of the target node.

In this embodiment, the minimum value of the path lengths between the visible points and the target node is determined, and the path between the visible point corresponding to the minimum value and the target node is used as the extended road of the target node. Since only the shortest extended road is determined each time, the probability of errors in the determined extended road is reduced.

Figure 4:
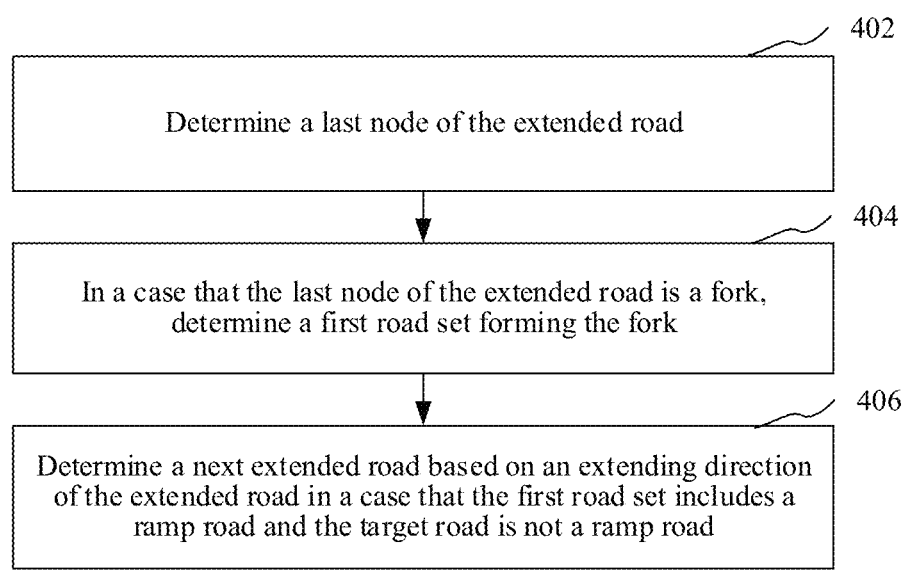
FIG. 4 is a flowchart of determining an extended road of a fork according to an embodiment.

FIG. 4 is a flowchart of determining an extended road of a fork according to an embodiment. In an embodiment, as shown in FIG. 4, before the updating the electronic map based on the extended road, the method further includes:

In operation 402, the system determines a last node of the extended road.

Specifically, the extended road includes two nodes. One of the nodes is a target node, and the target node is used as a first node of the extended road. The target node may be the first node of the target road or the last node of the target road. Regardless of whether the target node is the first node or the last node of the target road, the target node is used as the first node of the extended road. A visible point in the extended road that is not the target node is used as the last node of the extended road. In this way, the terminal may determine the last node of the extended road.

In operation 404, the system, in a case that the last node of the extended road is a fork, determines a first road set forming the fork.

The fork is an intersection where at least two roads meet. The first road set includes roads meeting at the fork.

Specifically, after determining the last node of the extended road, the terminal determines whether the last node is a fork. In a case that the last node is not a fork, the terminal may use the last node of the extended road as the target node to determine a next extended road of the last node of the extended road.

Further, the terminal may determine the last node of the extended road as the target node, acquire visible points within a preset range of the target node, and determines path lengths between the visible points and the target node. The terminal determines the extended road according to the path lengths between the visible points and the target node, so as to obtain the next extended road of the last node of the extended road.

In a case that the last node of the extended road is a fork, the terminal determines roads forming the fork to obtain the first road set.

In operation 406, the system determines a next extended road based on an extending direction of the extended road in a case that the first road set includes a ramp road and the target road is not a ramp road.

The ramp, also known as an approach road, is an engineering term, which is generally a short land bridge/ramp/lead connection road providing vehicles with access to a main line (such as an expressway, an overpass, a bridge, and a road tunnel) and adjacent auxiliary roads, or other main lines, as well as the auxiliary connecting section of distribution roads.

Specifically, the terminal determines whether the first road set includes a ramp road, and determines whether the target road is a ramp road. In a case that the first road set includes a ramp road and the target road is not a ramp road, the terminal may use the last node of the extended road as the target node, and determine the next extended road according to a current extending direction of the extended road. Further, the terminal uses the last node as the target node, acquires visible points within a preset range of the target node, and determines path lengths between the visible points and the target node. The terminal determines the extended road according to the path lengths between the visible points and the target node, so as to obtain the next extended road of the last node of the extended road.

In this embodiment, in a case that the first road set includes no ramp road, the mining of the extended road of the target road ends, and the last node of the extended road has no next extended road.

In this embodiment, the last node of the extended road is determined. In a case that the last node of the extended road is a fork, the first road set forming the fork is determined, to determine whether the mining of the extended road of the target road ends. In a case that the first road set includes the ramp road and the target road is not the ramp road, the next extended road is determined based on the extending direction of the extended road, to mine one or more extended roads of the target road.

Figure 5A:
FIG. 5*a* is a diagram of determining an extended road of an intrinsic upper road according to an embodiment.

FIG. 5a is a diagram of determining an extended road of an intrinsic upper road according to an embodiment. As shown in FIG. 5a, a dark gray solid line in the figure is an intrinsic upper road. By virtue of the connectivity of the road network, the dark gray solid line may extend from a first node of the road (that is, extends toward the west) to obtain a black extended road having an arrow. The extended road having the arrow is an extended upper road. In the black dashed-line box, a fork present at a black arrow node (a last node of the extended road) is clearly seen. Therefore, the extension in the direction of the first node ends.

Figure 5B:
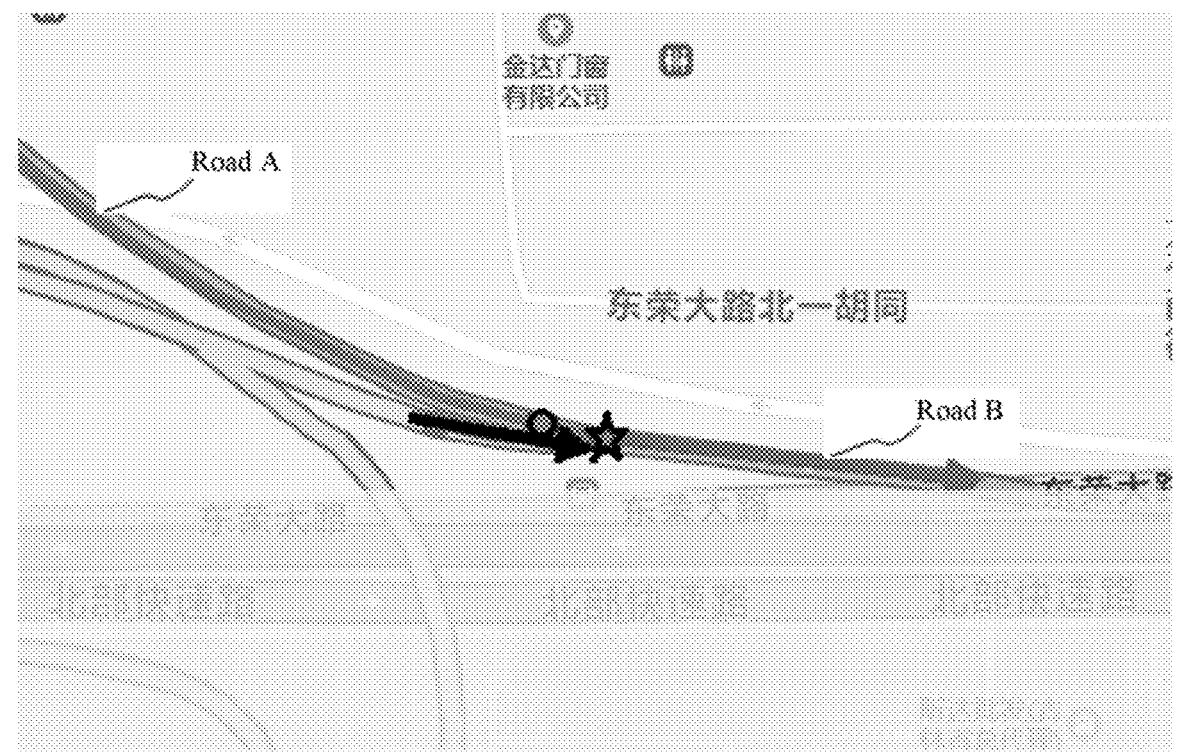
FIG. 5*b* is a diagram of determining an extended road of an intrinsic upper road according to another embodiment.

FIG. 5b is a diagram of determining an extended road of an intrinsic upper road according to another embodiment. In FIG. 5b, in a case that a road A extends to a five-pointed star, the extension stops due to a black solid line road having an arrow that merges. However, in a case that the black solid line road having an arrow is a ramp, and the road A and a road B are not ramps, the road A is allowed to further extend along the road B.

In an embodiment, the target road is the intrinsic upper road of the overpass. Before the updating the electronic map based on the extended road, the method further includes: in a case that the target road is a circular road and the last node of the extended road is a fork, determining a second road set forming the fork; and using a non-circular road in the second road set as the next extended road of the extended road.

Specifically, in a case that the target road is the intrinsic upper road of the overpass, the terminal determines whether the target road is a circular road. The terminal determines a last node of the extended road, and determines whether the last node is a fork. In a case that the last node of the extended road is a fork, the terminal determines roads forming the fork to obtain the second road set. Next, the terminal determines whether the second road set includes a non-circular road. In a case that the target road is a circular road and the second road set includes the non-circular road, the non-circular road is used as the next extended road of the extended road.

In this embodiment, in a case that the target road is a circular road and the last node of the extended road is a fork, the second road set forming the fork is determined, and the non-circular road in the second road set is used as the next extended road of the extended road, such that an extended road mining manner of the circular road may be determined. Therefore, specific processing may be performed according to the different characteristics of different roads, and the extended road obtained by mining is more accurate.

Figure 5C:
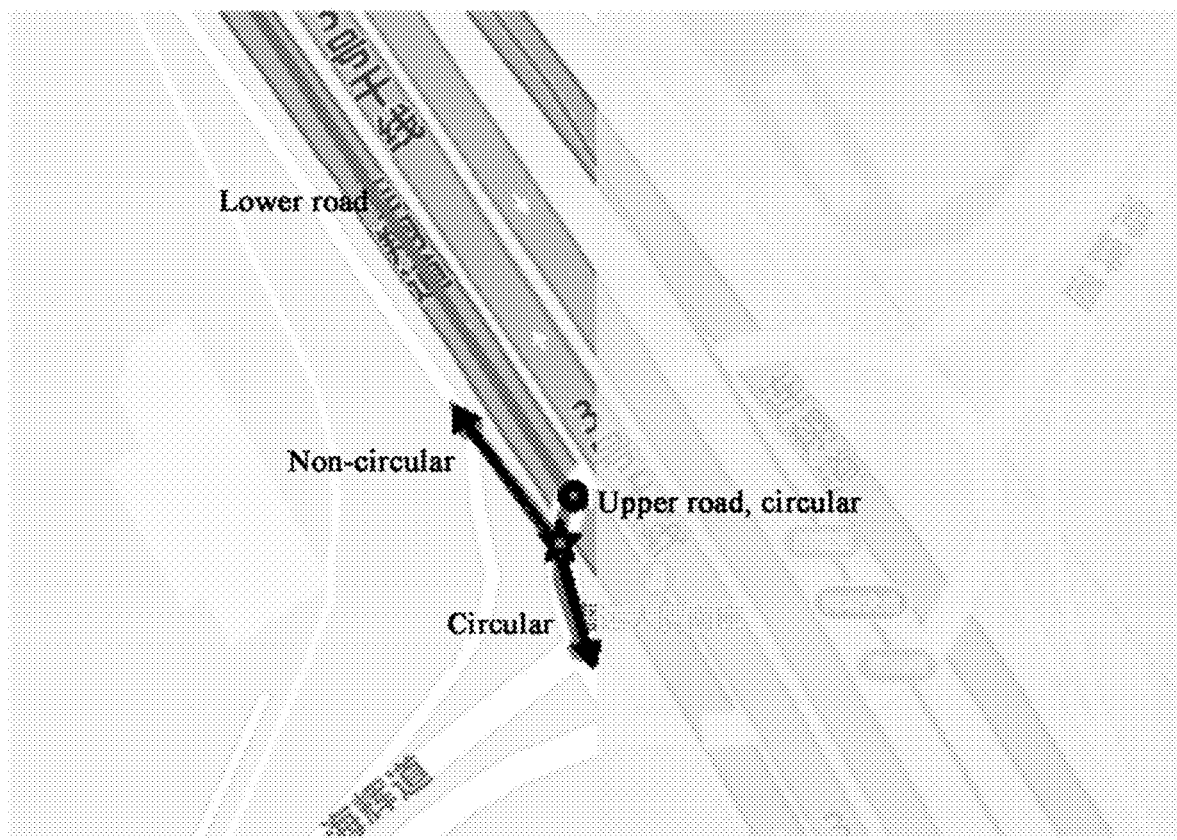
FIG. 5*c* is a diagram of determining an extended road of a circular intrinsic upper road according to an embodiment.

FIG. 5c is a diagram of determining an extended road of a circular intrinsic upper road according to an embodiment. As shown in FIG. 5c, the intrinsic upper road is a circular road. In a case that the extended road on the intrinsic upper road reaches a fork position shown by a five-pointed star in the figure, where the node shown by the five-pointed star connects two circular roads, one of the two circular roads is on the intrinsic upper road, and the fork shown by the five-pointed star is also connected to a non-circular road, a black non-circular road having an arrow, instead of the black circular road having an arrow, is selected as the extended road of the intrinsic upper road. Therefore, a manner of determining the extended road of the circular intrinsic upper road may be determined.

In an embodiment, the target road is the intrinsic lower road of the overpass. Acquiring the target node of the target road includes acquiring an intrinsic upper road corresponding to the intrinsic lower road of the overpass, and determining, according to a distance between the intrinsic upper road and the intrinsic lower road, a target node from which the intrinsic lower road extends.

The target node from which the intrinsic lower road extends is at least one of a first node or a last node from which the intrinsic lower road extends.

Specifically, in a case that the target road is the intrinsic lower road of the overpass, the terminal acquires the intrinsic upper road corresponding to the intrinsic lower road. The terminal determines a first node and a last node of the intrinsic lower road, and calculates distances between the first node and the last node of the intrinsic lower road and the intrinsic upper road respectively. The terminal determines, according to the distances between the first node and the last node of the intrinsic lower road and the intrinsic upper road respectively, the target node from which the intrinsic lower road extends.

In this embodiment, the intrinsic upper road corresponding to the intrinsic lower road of the overpass is acquired, and the target node from which the intrinsic lower road extends is determined according to the distance between the intrinsic upper road and the intrinsic lower road. Therefore, a direction in which the intrinsic lower road has an extended road may be determined according to the data of the intrinsic upper road and the intrinsic lower road, to realize the mining of the extended road of the intrinsic lower road.

In an embodiment, the determining, according to a distance between the intrinsic upper road and the intrinsic lower road, a target node from which the intrinsic lower road extends includes determining a first pedal distance between a first node of the intrinsic lower road and the corresponding intrinsic upper road of the overpass, and determining a second pedal distance between a last node of the intrinsic lower road of the overpass and the intrinsic upper road; and using, as the target node from which the intrinsic lower road extends, a node corresponding to the pedal distance less than or equal to the distance threshold in a case that at least one of the first pedal distance or the second pedal distance is less than or equal to a distance threshold.

The pedal distance is an approximate projection distance of a point projected onto another road. The approximate projection distance is used herein. This is because the road is composed of a polyline composed of thinned points. During calculation of the projection distance, only a projection distance from the point to the corresponding polyline may be obtained, and the projection distance to the road cannot be accurately calculated.

Figure 6A:
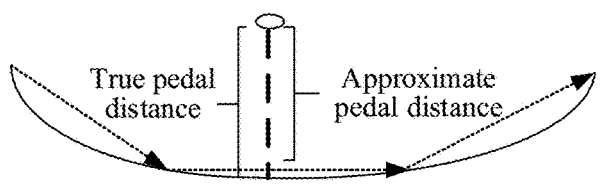
FIG. 6*a* is a diagram of comparison between a true pedal distance and an approximate pedal distance according to an embodiment.

FIG. 6a is a diagram of comparison between a true pedal distance and an approximate pedal distance according to an embodiment. FIG. 6a shows a true pedal distance and an approximate pedal distance from a point on a road to another road. The first pedal distance and the second pedal distance in this embodiment are both the approximate pedal distance.

The distance threshold is a limit value of the pedal distance from the node on the intrinsic lower road to the intrinsic upper road.

Specifically, the terminal determines a start point and an end point of the intrinsic lower road of the overpass. The terminal may use the start point of the intrinsic lower road as the first node and use the end point of the intrinsic lower road as the last node. It may be understood that the first node and the last node are relative to each other. Next, the terminal may calculate a pedal distance from the first node to the intrinsic upper road to obtain the first pedal distance. The terminal may calculate a pedal distance from the last node to the intrinsic upper road to obtain the second pedal distance. The terminal acquires the distance threshold, and compares the first pedal distance and the second pedal distance with the distance threshold.

In a case that the first pedal distance is less than or equal to the distance threshold, regardless of whether the second pedal distance is less than or equal to the distance threshold, the first node corresponding to the first pedal distance is used as the target node from which the intrinsic lower road extends. That is to say, in a case that the first pedal distance is less than or equal to the distance threshold, the first node corresponding to the first pedal distance is used as the target node from which the intrinsic lower road extends.

In a case that the second pedal distance is less than or equal to the distance threshold, regardless of whether the first pedal distance is less than or equal to the distance threshold, the last node corresponding to the second pedal distance is used as the target node from which the intrinsic lower road extends. That is to say, in a case that the second pedal distance is less than or equal to the distance threshold, the last node corresponding to the second pedal distance is used as the target node from which the intrinsic lower road extends.

In a case that the first pedal distance is less than or equal to the distance threshold, and the second pedal distance is less than or equal to the distance threshold, the first node and the last node of the intrinsic lower road are both used as the target node from which the intrinsic lower road extends. Further, in a case that any of the following four conditions is found: the first pedal distance and the second pedal distance are both less than the distance threshold, the first pedal distance and the second pedal distance are both equal to the distance threshold, the first pedal distance is less than the distance threshold and the second pedal distance is equal to the distance threshold, or the first pedal distance is equal to the distance threshold and the second pedal distance is less than the distance threshold, the first node and the last node of the intrinsic lower road are both used as the target node from which the intrinsic lower road extends.

In this embodiment, the first pedal distance between the first node of the intrinsic lower road and the corresponding intrinsic upper road of the overpass is determined, the second pedal distance between the last node of the intrinsic lower road of the overpass and the intrinsic upper road is determined, and in a case that at least one of the first pedal distance or the second pedal distance is less than or equal to the distance threshold, the node corresponding to the pedal distance less than or equal to the distance threshold is used as the target node from which the intrinsic lower road extends. Therefore, a node allowing road extension may be determined according to the pedal distances between the first node and the last node of the intrinsic lower road and the intrinsic upper road, thereby determining the extending direction of the intrinsic lower road.

Figure 6B:
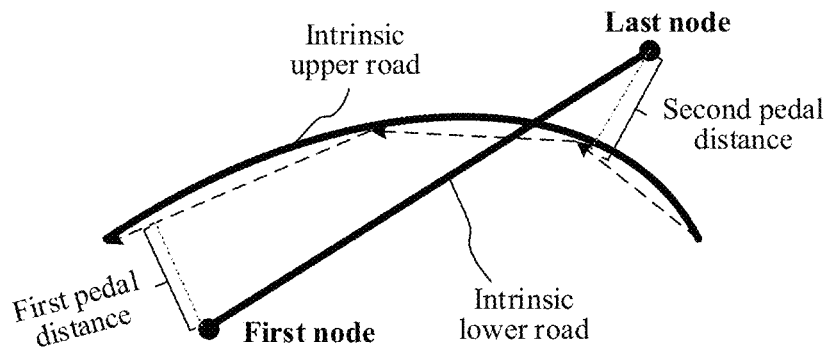
FIG. 6*b* is a flowchart of determining a target node from which an intrinsic lower road extends according to an embodiment.

FIG. 6b is a flowchart of determining a target node from which an intrinsic lower road extends according to an embodiment. As shown in FIG. 6b, the terminal determines the first node and the last node of the intrinsic lower road, and calculates the first pedal distance between the first node and the intrinsic upper road, and calculates the second pedal distance between the last node and the intrinsic upper road. In a case that the first pedal distance is less than or equal to the distance threshold, regardless of whether the second pedal distance is less than or equal to the distance threshold, the intrinsic lower road is allowed to extend from the first node. Similarly, in a case that the second pedal distance is less than or equal to the distance threshold, regardless of whether the first pedal distance is less than or equal to the distance threshold, the intrinsic lower road is allowed to extend from the last node.

In an embodiment, the determining, according to a distance between the intrinsic upper road and the intrinsic lower road, a target node from which the intrinsic lower road extends further includes in a case that the first pedal distance and the second pedal distance are both greater than the distance threshold, determining a minimum value of the first pedal distance and the second pedal distance; and using, as the target node from which the intrinsic lower road extends, a node corresponding to the minimum value.

Specifically, in a case that the terminal detects that the first pedal distance and the second pedal distance are both greater than the distance threshold, the terminal may compare the first pedal distance with the second pedal distance. The terminal determines the minimum value of the first pedal distance and the second pedal distance, determines the node corresponding to the minimum pedal distance, and uses the node corresponding to the minimum value as the target node from which the intrinsic lower road extends.

In this embodiment, in a case that the first pedal distance and the second pedal distance are both greater than the distance threshold, the minimum value of the first pedal distance and the second pedal distance is determined, and the node corresponding to the minimum value is determined as the target node from which the intrinsic lower road extends. Therefore, a processing manner is determined for the case that the pedal distances between the first node and the last node and the intrinsic upper road are both greater than the distance threshold, thereby determining the extending direction of the intrinsic lower road. In this way, specific processing may be performed according to the different road data, and the extended road obtained by mining is more consistent with an actual status.

In an embodiment, in a case that the first pedal distance is greater than the distance threshold and the second pedal distance is equal to the distance threshold, or the first pedal distance is equal to the distance threshold and the second pedal distance is greater than the distance threshold, the terminal determines the minimum value of the first pedal distance and the second pedal distance, determines the node corresponding to the minimum pedal distance, and uses the node corresponding to the minimum value as the target node from which the intrinsic lower road extends.

This embodiment provides the processing manner for the case that one of the pedal distances is greater than the threshold and another pedal distances is equal to the threshold, so as to perform specific processing according to the characteristics of different roads for mining of extended roads.

Figure 7:
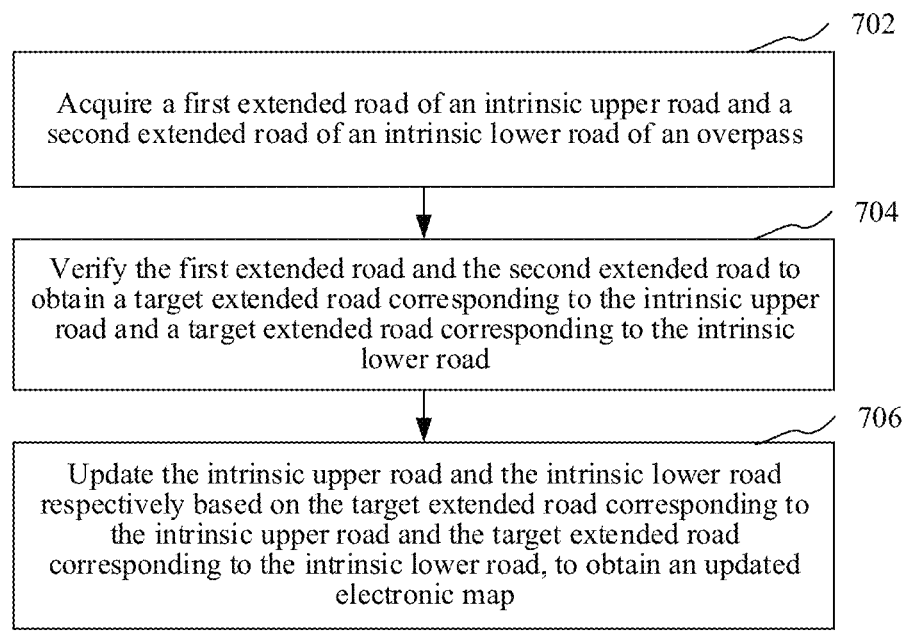
FIG. 7 is a flowchart of an operation of updating an electronic map based on an extended road according to an embodiment.

FIG. 7 is a flowchart of an operation of updating an electronic map based on an extended road according to an embodiment. In an embodiment, as shown in FIG. 7, the updating the electronic map based on the extended road includes the following operations:

In operation 702, the system acquires a first extended road of the intrinsic upper road and a second extended road of the intrinsic lower road of the overpass.

The first extended road is an extended road on the intrinsic upper road, and the second extended road is an extended road on the intrinsic lower road. The first extended road may be one extended road, or may include a plurality of extended roads. The second extended road may be one extended road, or may include a plurality of extended roads.

Specifically, the terminal may acquire extended roads on the intrinsic upper road of the overpass, and uses each extended road as the first extended road to obtain a plurality of first extended roads corresponding to the intrinsic upper road. Alternatively, the plurality of extended roads on the intrinsic upper road of the overpass may be used as one first extended road. Similarly, the terminal may acquire extended roads of the intrinsic lower road of the overpass, and use each extended road as the second extended road to obtain a plurality of second extended roads corresponding to the intrinsic lower road. Alternatively, the terminal may use the plurality of extended roads corresponding to the intrinsic lower road of the overpass as one second extended road. The expression "a plurality of" may refer to at least two.

In operation 704, the system verifies the first extended road and the second extended road to obtain a target extended road corresponding to the intrinsic upper road and a target extended road corresponding to the intrinsic lower road.

The target extended road is a real road.

Specifically, in a case that the intrinsic upper road corresponds to a plurality of first extended roads and the intrinsic lower road corresponds to a plurality of second extended roads, the terminal verifies each first extended road to determine the target extended road corresponding to the intrinsic upper road, and verifies each second extended road to determine the target extended road corresponding to the intrinsic lower road.

In a case that the first extended road and the second extended road are composed of a plurality of extended roads, the terminal verifies each extended road in the first extended road and the second extended road, where a verified extended road is the target extended road, thereby determining the target extended roads corresponding to the intrinsic upper road and the intrinsic lower road.

In operation 706, the system updates the intrinsic upper road and the intrinsic lower road respectively based on the target extended road corresponding to the intrinsic upper road and the target extended road corresponding to the intrinsic lower road, to obtain an updated electronic map.

Specifically, the terminal adds the target extended road corresponding to the intrinsic upper road to a corresponding position in the electronic map, thereby updating the intrinsic upper road. The terminal adds the target extended road corresponding to the intrinsic lower road to a corresponding position in the electronic map, thereby updating the intrinsic lower road and obtaining an updated electronic map.

In this embodiment, the first extended road of the intrinsic upper road and the second extended road of the intrinsic lower road of the overpass are acquired, and the first extended road and the second extended road are verified to determine whether the determined extended roads are true and reliable to obtain the real extended road corresponding to the intrinsic upper road and the real extended road corresponding to the intrinsic lower road. The intrinsic upper road and the intrinsic lower road are updated based on the actual extended roads corresponding to the intrinsic upper road and the intrinsic lower road, to obtain an updated electronic map, thereby saving a time and costs of manually collecting the overpass road data. In addition, the updated electronic map may display more road data and the road data in the electronic map is more consistent with real roads.

In an embodiment, the verifying the first extended road and the second extended road to obtain a target extended road corresponding to the intrinsic upper road and a target extended road corresponding to the intrinsic lower road includes determining whether the first target extended road is parallel to the second extended road; and using the first extended road as the target extended road corresponding to the intrinsic upper road and using the second extended road as the target extended road corresponding to the intrinsic lower road in a case that the first extended road is parallel to the second extended road.

The expression "parallel" may mean that extending directions of the first extended road and the second extended road are the same, a pedal distance between the two roads satisfies the distance threshold, and an angle between the two roads satisfies an angle threshold.

Specifically, the terminal may acquire the first extended road corresponding to the intrinsic upper road and the second extended road corresponding to the intrinsic lower road determine the pedal distance between the first extended road and the second extended road, determine the angle between the first extended road and the second extended road, and determine whether the first extended road is parallel to the second extended road according to whether the pedal distance satisfies the threshold and whether the angle satisfies the angle threshold. In a case that the first extended road is parallel to the second extended road, the first extended road is used as the target extended road corresponding to the intrinsic upper road, and the second extended road is used as the target extended road corresponding to the intrinsic lower road.

In this embodiment, in a case that a plurality of extended roads are present in the first extended road and the second extended road, the terminal may determine whether each extended road in the first extended road is parallel to the extended road in the second extended road, and use the parallel extended roads as the target extended roads corresponding to the intrinsic upper road and the intrinsic lower road respectively.

In this embodiment, in a case that any extended road in the first extended road is not parallel to each extended road in the second extended road, the non-parallel extended road is deleted. The terminal may determine the extended roads in the first extended road and the extended roads in the second extended road parallel to each other, and delete the extended roads not parallel to each other.

In this embodiment, it is determined whether the first extended road is parallel to the second extended road. In a case that the first extended road is parallel to the second extended road, the first extended road is used as the target extended road corresponding to the intrinsic upper road, and the second extended road is used as the target extended road corresponding to the intrinsic lower road. The true extended roads of the intrinsic upper road and the intrinsic lower road are accurately determined by determining whether the extended roads are parallel to each other, so as to verify whether the mined extended roads are true and accurate.

Figure 8:
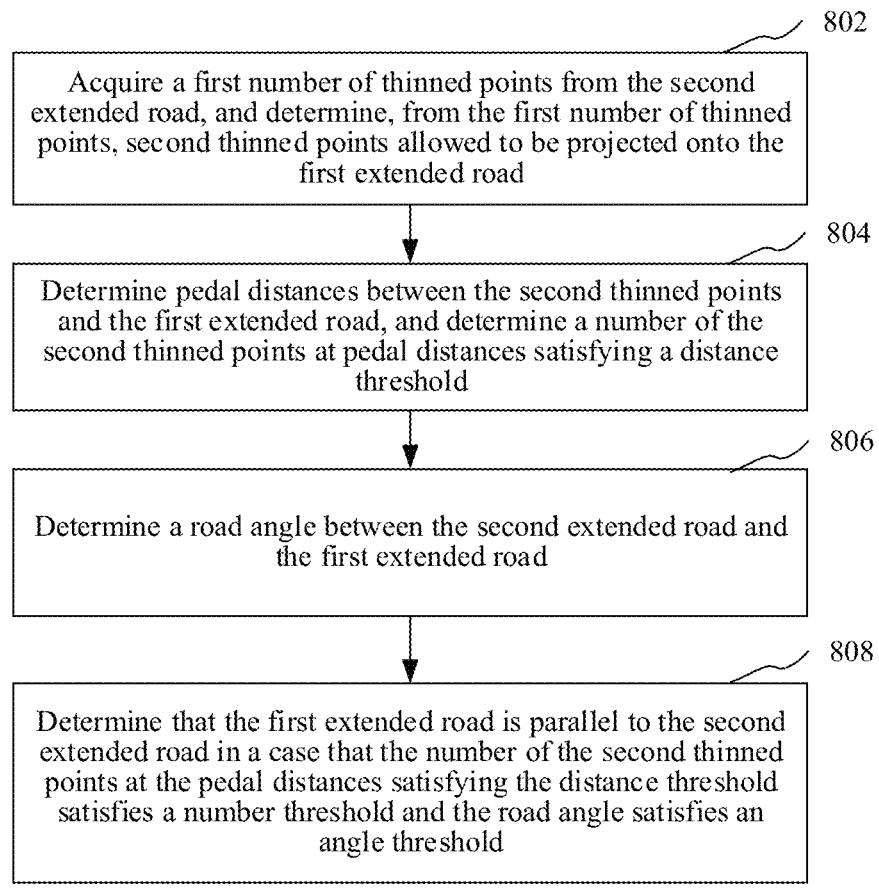
FIG. 8 is a flowchart of an operation of determining whether a first extended road is parallel to a second extended road according to an embodiment.

FIG. 8 is a flowchart of an operation of determining whether a first extended road is parallel to a second extended road according to an embodiment. In an embodiment, as shown in FIG. 8, determining whether the first extended road is parallel to the second extended road includes the following operations:

In operation 802, the system acquires a first number of thinned points from the second extended road, and determine, from the first number of thinned points, second thinned points allowed to be projected onto the first extended road.

The thinned points are key points on the second extended road, which represent key information of the second extended road. The thinned points may be visible points on the first extended road, or may not be visible points. The second thinned points are thinned points truly projected onto the first extended road.

Specifically, the terminal may acquire the first number of thinned points from the second extended road, to omit non-key points on the second extended road. Next, the terminal may determine the first number of thinned points that may be truly projected onto thinned points on the first extended road, to obtain the second thinned points. The true projection may mean that a point is projected onto a polyline of a road, rather than projected onto an extended line of the polyline.

Figure 9A:
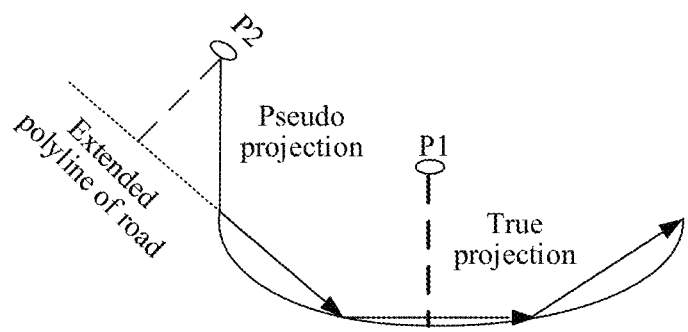
FIG. 9*a* is a diagram of a true projection and a pseudo projection according to an embodiment.

FIG. 9a is a diagram of a true projection and a pseudo projection according to an embodiment. The pseudo projection may mean that a point is projected onto an extended line of a polyline of a road. FIG. 9a shows examples of a true projection and a pseudo projection. In the figure, a point P1 is truly projected onto a road, and a point P2 is projected onto an extended line of a polyline of the road. Therefore, a pseudo projection distance (a black solid line), rather than a distance shown by a black dashed line is used as a projection distance from the point P2 to the road shown in the figure.

The terminal may generate a corresponding polyline on the first extended road, and project the first number of thinned points onto the polyline corresponding to the first extended road. Next, the terminal may determine thinned points in the first number of thinned points truly projected onto the first extended road, and to obtain the second thinned points. That is to say, the thinned points in the thinned points projected onto the corresponding polyline on the first extended road are true projections. The terminal may determine thinned points in the first number of thinned points pseudo-projected onto the first extended road. That is to say, the thinned points in the thinned points projected onto an extension line of the corresponding polyline on the first extended road are pseudo projections.

In operation 804, the system determines pedal distances between the second thinned points and the first extended road, and determine a number of the second thinned points at pedal distances satisfying a distance threshold.

In operation 806, the system determines a road angle between the second extended road and the first extended road.

Specifically, the terminal may calculate a pedal distance between each second thinned point and the first extended road, to obtain the pedal distance between each second thinned point and the first extended road. Next, the terminal acquires the distance threshold, and compares the pedal distance between each second thinned point and the first extended road with the distance threshold. The second thinned points at the pedal distances satisfying the distance threshold are selected by comparison, so as to determine the number of the second thinned points at the pedal distances satisfying the distance threshold. The pedal distances satisfying the distance threshold may mean that the pedal distances are less than the distance threshold. The terminal calculates the road angle between the second extended road and the first extended road on a plane.

In operation 808, the system determines that the first extended road is parallel to the second extended road in a case that the number of the second thinned points at the pedal distances satisfying the distance threshold satisfies a number threshold and the road angle satisfies an angle threshold.

Specifically, the terminal acquires the number threshold, and compares the number of the second thinned points satisfying the distance threshold with the number threshold to determine whether the number of the second thinned points satisfying the distance threshold satisfies the number threshold. The terminal acquires the angle threshold, and compares the road angle between the second extended road and the first extended road on the plane with the angle threshold to determine whether the road angle satisfies the angle threshold. In a case that the number of the second thinned points at the pedal distances satisfying the distance threshold satisfies the number threshold and the road angle satisfies the angle threshold, it is determined that the first extended road is parallel to the second extended road.

In this embodiment, in a case that there are second thinned points at pedal distances to the first extended road less than the distance threshold, a number of the second thinned points at the pedal distances less than the distance threshold is greater than or equal to the number threshold, and the road angle is less than the angle threshold, the first extended road is parallel to the second extended road.

In this embodiment, the first number of thinned points are acquired from the second extended road, and the second thinned points in the first number of thinned points allowed to be projected onto the first extended road are determined, the pedal distances between the second thinned points and the first extended road are determined, the number of the second thinned points at the pedal distances satisfying the distance threshold are determined, and the road angle between the second extended road and the first extended road is determined. It is determined by using the three conditions whether the first extended road and the second extended road are parallel within a specific spatial distance. In a case that the number of the second thinned points at the pedal distances satisfying the distance threshold satisfies the number threshold and the angle satisfies the angle threshold (that is to say, the three conditions are all satisfied), it is determined that the first extended road is parallel to the second extended road. Therefore, the accuracy and the reliability of the obtained results are ensured.

In an embodiment, the determining a road angle between the second extended road and the first extended road includes determining a road angle between a polyline formed by the first number of thinned points and the first extended road, an extending direction of the polyline being same as an extending direction of the first extended road.

Specifically, the terminal generates a directional polyline corresponding to the first extended road, and determines a directional polyline composed of the first number of thinned points. In a case that the extending directions of the second extended road and the first extended road are the same, the direction of the polyline corresponding to the first extended road is the same as the direction of the polyline composed of the first number of thinned points. The terminal calculates two angles between the polyline formed by the first number of thinned points and the polyline corresponding to the first extended road.

Figure 9B:
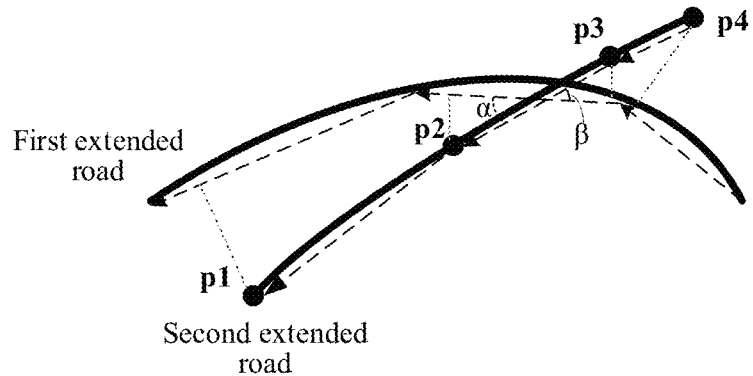
FIG. 9*b* is a diagram of the first extended road and the second extended road being parallel according to an embodiment.

FIG. 9b is a diagram of the first extended road and the second extended road being parallel according to an embodiment.

The parallel conditions include the following: ① m thinned points in n thinned points of the second extended road corresponding to the intrinsic lower road may be truly projected onto a first extended road in the group, and the pedal distance is less than a specific threshold (which is generally 40 m). Generally, $m=kn, k \in (0.5,1)$. ② The angle between the directional polyline composed of the thinned points of the second extended road and the corresponding directional polyline corresponding to the upper road is less than a specific threshold (which is generally 45°). The terminal may generate a corresponding polyline on the first extended road, acquire 4 thinned points p1, p2, p3, and p4 from the second extended road, and project the thinned points p1, p2, p3, and p4 onto the polyline corresponding to the first extended road. That is to say, m=4. In a case that the parameter k is 0.5, according to $m=kn, k \in (0.5,1)$, the number threshold n is 2. The terminal determines the number of the thinned points that may be truly projected onto the first extended road. p1, p2, p3, and p4 in FIG. 9b are all real projections. In this case, the number of the thinned points which are real projections is greater than the number threshold. In this case, the terminal determines the pedal distances by which p1, p2, p3, and p4 are projected onto the polyline corresponding to the first extended road, and compares the pedal distances with the distance threshold of 40 meters. It is learned by means of calculation that the pedal distances from P1 and P4 to the first extended road are greater than 40 m, and the pedal distances from the two thinned points of P2 and P3 to the first extended road are less than 40 m. That is to say, P2 and P3 satisfy the condition ①.

Next, the terminal may calculate an angle between a directional polyline composed of p2 and p3 in FIG. 9b and the polyline segment corresponding to the first extended road. p2 corresponds to an angle α, and p3 corresponds to an angle β. In a case that the angles α and β are both less than 45°, p2 and p3 satisfy the condition ②. Therefore, a second extended road composed of P1 and P4 is parallel to the first extended road within a specific spatial distance. The first extended road is a real extended road on the intrinsic upper road, and the second extended road is a real extended road on the intrinsic lower road.

In an embodiment, the verifying the first extended road and the second extended road to obtain a target extended road corresponding to the intrinsic upper road and a target extended road corresponding to the intrinsic lower road includes in a case that the intrinsic upper road of the overpass corresponds to at least two first extended roads, determining whether the at least two first extended roads include a road parallel to the second extended road; and in a case that the at least two first extended roads include the extended road parallel to the second extended road, using, as the target extended road corresponding to the intrinsic upper road, the first extended road parallel to the second extended road, and using the second extended road as the target extended road corresponding to the intrinsic lower road.

Specifically, in a case that the first extended road includes only one extended road and the second extended road includes only one extended road, the terminal acquires the at least two first extended roads corresponding to the intrinsic upper road of the overpass, and acquires the second extended road corresponding to the intrinsic lower road.

Next, the terminal determines whether a parallel first extended road may be found for each second extended road. In a case that the at least two first extended roads include the extended road parallel to the second extended road, the first extended road and the second extended road parallel to each other are determined. The terminal uses the parallel first extended road as the target extended road corresponding to the intrinsic upper road, and uses the parallel second extended road as the target extended road corresponding to the intrinsic lower road.

In the same way, all target extended roads corresponding to the intrinsic upper road and all target extended roads corresponding to the intrinsic lower road may be determined.

In this embodiment, in a case that the intrinsic upper road of the overpass corresponds to the at least two first extended roads, it is determined whether the at least two first extended roads include the road parallel to the second extended road, and in a case that the at least two first extended roads include the extended road parallel to the second extended road, the first extended road parallel to the second extended road is used as the target extended road corresponding to the intrinsic upper road, and the second extended road is used as the target extended road corresponding to the intrinsic lower road. In this way, the real extended road corresponding to the intrinsic upper road and the real extended road corresponding to the intrinsic lower road may be determined, and the accuracy of the target extended roads may be ensured.

In this embodiment, the method further includes deleting extended roads corresponding to the intrinsic upper road and the intrinsic lower road other than the target extended roads.

Specifically, the terminal uses, as the target extended road corresponding to the intrinsic upper road, the first extended road parallel to the second extended road, and uses the second extended road as the target extended road corresponding to the intrinsic lower road. The remaining first extended roads not parallel to the second extended road are wrong extended roads. The terminal deletes the remaining extended roads other than the target extended roads. Therefore, only the target extended roads are retained on the electronic map, thereby ensuring the accuracy of the extended roads.

Figure 10:
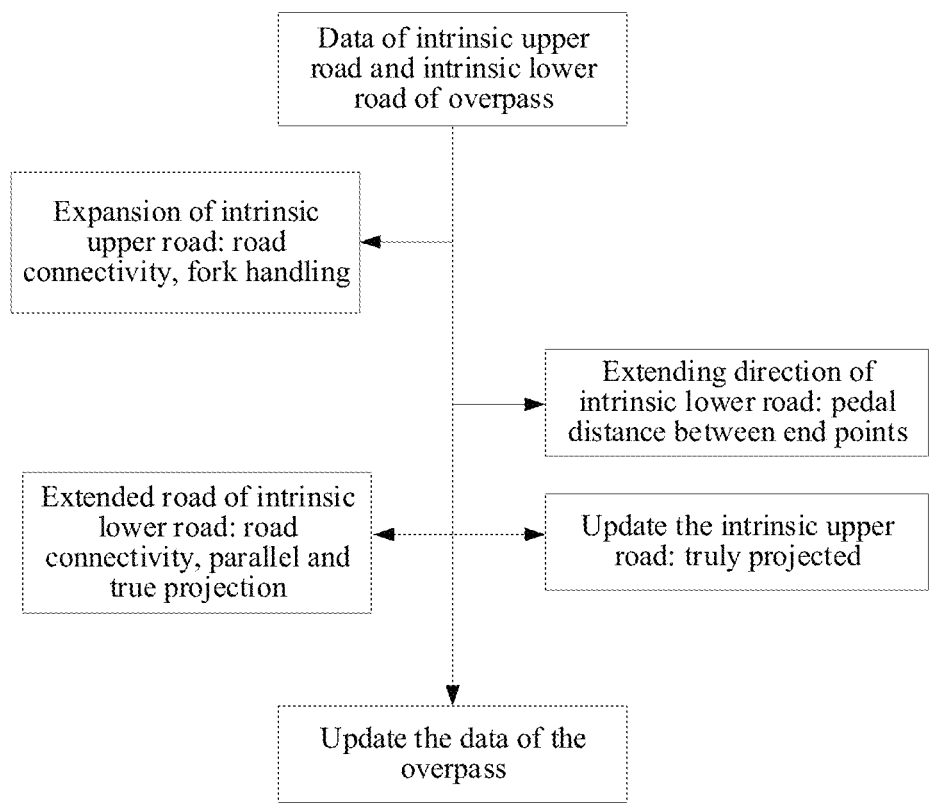
FIG. 10 is a flowchart of a road update principle for an electronic map according to an embodiment.

FIG. 10 is a flowchart of a road update principle for an electronic map according to an embodiment. First, a terminal may acquire a road topology network based on an electronic map, to obtain intrinsic upper road data and intrinsic lower road data of an overpass. Next, the terminal determines an extended road of an intrinsic upper road based on road connectivity. In a case that a last node of the extended road is a fork, specific processing is performed according to characteristics of the fork, so as to complete determination of the extended road of the intrinsic upper road. Next, the terminal determines, according to pedal distances between a first node and a last node of the intrinsic lower road and the intrinsic upper road respectively, an extending direction of the intrinsic lower road. After the extending direction is determined, the extended road of the intrinsic lower road is determined based on the road connectivity. Next, it is necessary to verify the extended road of the intrinsic upper road and the extended road on the intrinsic lower road to determine whether the obtained extended roads are real and accurate. The terminal may acquire thinned points on the extended road of the intrinsic lower road, and determine whether the extended roads are real and accurate according to whether the thinned points may be truly projected onto the extended road of the intrinsic upper road and whether the extended road of the intrinsic upper road is parallel to the extended road of the intrinsic lower road. The intrinsic upper road data and the intrinsic lower road data are updated according to the determined real extended roads, and the updated data is outputted, thereby obtaining an updated road topology network and an updated electronic map. By means of this embodiment, mining may be performed based on the intrinsic upper road data and the intrinsic lower road data of the overpass, to determine the extended roads of the intrinsic upper road and the intrinsic lower road. Manual collection is not required, and the time and the cost may be saved. Moreover, the upper road information and the lower road information of the overpass is visually displayed on the electronic map, such that the electronic map includes more information.

In an embodiment, the method further includes performing path planning based on the updated electronic map.

Specifically, the terminal acquires an origin and a destination based on the updated electronic map, and acquires road data between the origin and the destination and vehicle information. The terminal may determine whether an overpass exists between the origin and destination, and acquires upper road information and lower road information of the overpass in a case that the overpass exists. A shortest path to the destination is determined according to the road data between the origin and the destination, the upper road information and the lower road information of the overpass, and the vehicle information. Next, the terminal acquires a current position of a user every preset time, and determines whether the user yaws according to the current position and a destination of the user. In a case that the user yaws, path re-planning is performed based on the current position.

In this embodiment, in a case that a distance between an origin of the upper road or the lower road of the overpass and the current position reaches a preset distance, a path length of the overpass road is determined, and a voice prompt is provided to the user, for example, "enter the upper road of the overpass 300 meters ahead".

In a case that the current position is at the upper road or the lower road of the overpass, the terminal determines a path length between the current position and the last node of the upper road or the lower road and an estimated time that is spent, and broadcasts the path length and the estimated time that is spent through voice.

In this embodiment, the upper road data and the lower road data of the overpass are added to the electronic map, such that the data of the electronic map is more complete, thereby providing more effective information for the path planning, and achieving more accurate path planning. In a case that the current position of the user is at the upper road or the lower road of the overpass, the terminal may remind the user in real time of a path length and a required time to the end node, and effectively determines whether the user deviates from the planned path, thereby improving the flexibility and the accuracy of the path planning.

In an embodiment, a road updating method for an electronic map is provided.

A terminal acquires the electronic map, and acquires a corresponding road topology network based on the electronic map.

The terminal acquires an intrinsic upper road and an intrinsic lower road of an overpass in the road topology network, and acquires a first node and a last node of the intrinsic upper road.

Next, the terminal acquires visible points within a preset range of the first node, and determines path lengths between the visible points and the first node.

Next, the terminal determines a minimum value of the path lengths between the visible points and the first node, and uses, as an extended road of the first node, a path between the visible point corresponding to the minimum value and the first node.

The terminal acquires visible points within a preset range of the last node of the intrinsic upper road, and determines path lengths between the visible points and the last node.

Further, the terminal determines a minimum value of the path lengths between the visible points and the last node; and uses, as an extended road of the last node, a path between the visible point corresponding to the minimum value and the last node.

The terminal determines a last node of the extended road. In a case that the last node of the extended road is a fork, the terminal determines a first road set forming the fork.

Optionally, in a case that the first road set includes a ramp road and the target road is not a ramp road, the terminal determines a next extended road based on an extending direction of the extended road.

Optionally, in a case that the target road is a circular road and the last node of the extended road is a fork, the terminal determines a second road set forming the fork, and uses a non-circular road in the second road set as the next extended road of the extended road.

Next, the terminal acquires a first extended road corresponding to the intrinsic upper road according to each extended road of the intrinsic upper road.

Next, the terminal acquires a first node and a last node of the intrinsic lower road, determines a first pedal distance between the first node of the intrinsic lower road of the overpass and a corresponding intrinsic upper road, and determines a second pedal distance between the last node of the intrinsic lower road and the intrinsic upper road of the overpass.

Optionally, in a case that at least one of the first pedal distance or the second pedal distance is less than or equal to a distance threshold, the terminal uses, as a target node from which the intrinsic lower road extends, a node corresponding to the pedal distance less than or equal to the distance threshold.

Optionally, in a case that the first pedal distance and the second pedal distance are both greater than the distance threshold, the terminal determines a minimum value of the first pedal distance and the second pedal distance, and uses, as the target node from which the intrinsic lower road extends, a node corresponding to the minimum value.

Next, the terminal acquires visible points within a preset range of the target node from which the intrinsic lower road extends, and determines path lengths between the visible points and the target node.

Further, the terminal determines a minimum value of the path lengths between the visible points and the target node, and uses, as an extended road of the target node from which the intrinsic lower road extends, a path between the visible point corresponding to the minimum value and the target node.

Next, the terminal determines a last node of the extended road. In a case that the last node of the extended road is a fork, the terminal determines a first road set forming the fork.

Optionally, in a case that the first road set includes a ramp road and the target road is not a ramp road, the terminal determines a next extended road based on an extending direction of the extended road.

Next, the terminal acquires a second extended road corresponding to the intrinsic lower road according to each extended road of the intrinsic lower road.

Next, the terminal acquires a first number of thinned points from the second extended road, and determines, from the first number of thinned points, second thinned points allowed to be projected onto the first extended road.

The terminal determines pedal distances between the second thinned points and the first extended road, and determines a number of the second thinned points at pedal distances satisfying a distance threshold.

Further, the terminal determines a road angle between a polyline formed by the first number of thinned points and the first extended road, an extending direction of the polyline being same as an extending direction of the first extended road.

In a case that the number of the second thinned points at the pedal distances satisfying the distance threshold satisfies a number threshold and the road angle satisfies an angle threshold, the terminal determines that the first extended road is parallel to the second extended road.

Further, in a case that the first extended road is parallel to the second extended road, the parallel first extended road is used as the target extended road corresponding to the intrinsic upper road, and the second parallel extended road is used as the target extended road corresponding to the intrinsic lower road.

Next, the terminal deletes extended roads corresponding to the intrinsic upper road and the intrinsic lower road other than the target extended roads.

Next, the terminal updates the intrinsic upper road and the intrinsic lower road respectively based on the target extended road corresponding to the intrinsic upper road and the target extended road corresponding to the intrinsic lower road, to obtain an updated electronic map and an updated road topology network.

Further, the terminal performs path planning based on the updated electronic map.

In this embodiment, the extended road of the intrinsic upper road is determined by using the path lengths between the visible points and the first node and the last node of the intrinsic upper road. The extending direction of the intrinsic lower road is determined according to the pedal distances between the first node and the last node of the intrinsic lower road and the intrinsic upper road, and the extended road of the intrinsic lower road is determined by using the path lengths between the visible points and the first node or the last node of the intrinsic lower road in the extending direction. Next, the authenticity and the accuracy of the extended road is verified depending on whether the extended road of the intrinsic upper road and the extended road of the intrinsic lower road are parallel, so as to obtain an accurate extended road. The road data of the overpass and the electronic map are updated based on the accurate extended road. Therefore, manual collection of the road data of the overpass on the spot is not required, saving the collection time and cost. The data of the updated electronic map is more complete, thereby providing more effective information for the path planning, and achieving more accurate path planning.

It is to be understood that, operations in FIG. 2 to FIG. 10 are sequentially displayed as indicated by arrows, but the operations are not necessarily sequentially performed in a sequence indicated by the arrows. Unless clearly specified in this specification, there is no strict sequence limitation on the execution of the operations, and the operations may be performed in another sequence. In addition, at least some of the operations in FIG. 2 to FIG. 10 may include a plurality of operations or a plurality of stages. These operations or stages are not necessarily performed at the same time point, but may be performed at different time points. These operations or stages are not necessarily executed sequentially, but may be performed in turn or alternately with another operations or at least some of operations or stages of the another operations.

Figure 11:
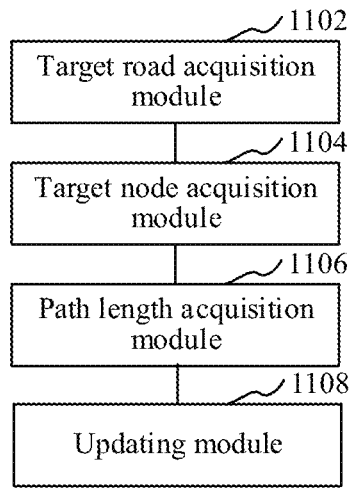
FIG. 11 is a diagram of a road updating apparatus for an electronic map according to an embodiment.

FIG. 11 is a diagram of a road updating apparatus for an electronic map according to an embodiment. In an embodiment, as shown in FIG. 11, a road updating apparatus for an electronic map is provided. The apparatus may use a software module or a hardware module or a combination of the software module and the hardware module as a part of a computer device. The apparatus specifically includes: a target road acquisition module 1102, a target node acquisition module 1104, a path length acquisition module 1106, and an updating module 1108.

The target road acquisition module 1102 is configured to acquire a target road in the electronic map, the target road being at least one of an intrinsic upper road or an intrinsic lower road of an overpass.

The target node acquisition module 1104 is configured to acquire a target node of the target road, the target node being at least one of a first node or a last node of the target road.

The path length acquisition module 1106 is configured to acquire visible points within a preset range of the target node, and determine path lengths between the visible points and the target node.

The updating module 1108 is configured to determine an extended road of the target node according to the path lengths between the visible points and the target node, and update the electronic map based on the extended road.

According to the above road updating apparatus for an electronic map, the target road in the electronic map is acquired, the target road being at least one of an intrinsic upper road or an intrinsic lower road of an overpass; the target node of the target road is acquired, the target node being at least one of the first node or the last node of the target road, the visible points within the preset range of the target node are acquired, the path lengths between the visible points and the target node are determined, the extended road of the target node is determined according to the path lengths between the visible points and the target node, and the electronic map is updated based on the extended road. In this way, manual collection of the road data of the overpass is omitted, saving the time and the collection costs. In addition, more road data information of the upper road and the lower road of the overpass are added to the electronic map, such that the electronic map has more information and is more consistent with an actual road status.

In an embodiment, the updating module 1108 is further configured to determine a minimum value of the path lengths between the visible points and the target node, and use, as an extended road of the target node, a path between the visible point corresponding to the minimum value and the target node.

In this embodiment, the minimum value of the path lengths between the visible points and the target node is determined, and the path between the visible point corresponding to the minimum value and the target node is used as the extended road of the target node. Since only the shortest extended road is determined each time, the probability of errors in the determined extended road is reduced.

In an embodiment, the updating module 1108 is further configured to: determine a last node of the extended road; in a case that the last node of the extended road is a fork, determine a first road set forming the fork; and determine a next extended road based on an extending direction of the extended road in a case that the first road set includes a ramp road and the target road is not a ramp road.

In this embodiment, the last node of the extended road is determined. In a case that the last node of the extended road is a fork, the first road set forming the fork is determined, to determine whether the mining of the extended road of the target road ends. In a case that the first road set includes the ramp road and the target road is not the ramp road, the next extended road is determined based on the extending direction of the extended road, to mine one or more extended roads of the target road.

In an embodiment, the target road is the intrinsic upper road of the overpass. The updating module 1108 is further configured to: in a case that the target road is a circular road and the last node of the extended road is a fork, determine a second road set forming the fork; and use a non-circular road in the second road set as the next extended road of the extended road.

In this embodiment, in a case that the target road is a circular road and the last node of the extended road is a fork, the second road set forming the fork is determined, and the non-circular road in the second road set is used as the next extended road of the extended road, such that an extended road mining manner of the circular road may be determined. Therefore, specific processing may be performed according to the different characteristics of different roads, and the extended road obtained by mining is more accurate.

In an embodiment, the target road is the intrinsic lower road of the overpass. The target node acquisition module 1104 is further configured to: acquire an intrinsic upper road corresponding to the intrinsic lower road of the overpass; and determine, according to a distance between the intrinsic upper road and the intrinsic lower road, a target node from which the intrinsic lower road extends.

In this embodiment, the intrinsic upper road corresponding to the intrinsic lower road of the overpass is acquired, and the target node from which the intrinsic lower road extends is determined according to the distance between the intrinsic upper road and the intrinsic lower road. Therefore, a direction in which the intrinsic lower road has an extended road may be determined according to the data of the intrinsic upper road and the intrinsic lower road, to realize the mining of the extended road of the intrinsic lower road.

In an embodiment, the target node acquisition module 1104 is further configured to: determine a first pedal distance between a first node of the intrinsic lower road and the corresponding intrinsic upper road of the overpass, and determine a second pedal distance between a last node of the intrinsic lower road of the overpass and the intrinsic upper road; and use, as the target node from which the intrinsic lower road extends, a node corresponding to the pedal distance less than or equal to the distance threshold in a case that at least one of the first pedal distance or the second pedal distance is less than or equal to a distance threshold.

In this embodiment, the first pedal distance between the first node of the intrinsic lower road and the corresponding intrinsic upper road of the overpass is determined, the second pedal distance between the last node of the intrinsic lower road of the overpass and the intrinsic upper road is determined, and in a case that at least one of the first pedal distance or the second pedal distance is less than or equal to the distance threshold, the node corresponding to the pedal distance less than or equal to the distance threshold is used as the target node from which the intrinsic lower road extends. Therefore, a node allowing road extension may be determined according to the pedal distances between the first node and the last node of the intrinsic lower road and the intrinsic upper road, thereby determining the extending direction of the intrinsic lower road.

In an embodiment, the target node acquisition module 1104 is further configured to: in a case that the first pedal distance and the second pedal distance are both greater than the distance threshold, determine a minimum value of the first pedal distance and the second pedal distance; and use, as the target node from which the intrinsic lower road extends, a node corresponding to the minimum value.

In this embodiment, in a case that the first pedal distance and the second pedal distance are both greater than the distance threshold, the minimum value of the first pedal distance and the second pedal distance is determined, and the node corresponding to the minimum value is determined as the target node from which the intrinsic lower road extends. Therefore, a processing manner is determined for the case that the pedal distances between the first node and the last node and the intrinsic upper road are both greater than the distance threshold, thereby determining the extending direction of the intrinsic lower road. In this way, specific processing may be performed according to the different road data, and the extended road obtained by mining is more consistent with an actual status.

In this embodiment, the updating module 1108 is further configured to: acquire a first extended road of the intrinsic upper road and a second extended road of the intrinsic lower road of the overpass, verify the first extended road and the second extended road to obtain a target extended road corresponding to the intrinsic upper road and a target extended road corresponding to the intrinsic lower road, and update the intrinsic upper road and the intrinsic lower road respectively based on the target extended road corresponding to the intrinsic upper road and the target extended road corresponding to the intrinsic lower road, to obtain an updated electronic map.

In this embodiment, the first extended road of the intrinsic upper road and the second extended road of the intrinsic lower road of the overpass are acquired, and the first extended road and the second extended road are verified to determine whether the determined extended roads are true and reliable to obtain the real extended road corresponding to the intrinsic upper road and the real extended road corresponding to the intrinsic lower road. The intrinsic upper road and the intrinsic lower road are updated based on the actual extended roads corresponding to the intrinsic upper road and the intrinsic lower road, to obtain an updated electronic map, thereby saving a time and costs of manually collecting the overpass road data. In addition, the updated electronic map may display more road data and the road data in the electronic map is more consistent with real roads.

In an embodiment, the updating module 1108 is further configured to determine whether the first extended road is parallel to the second extended road, and using the first extended road as the target extended road corresponding to the intrinsic upper road and using the second extended road as the target extended road corresponding to the intrinsic lower road in a case that the first extended road is parallel to the second extended road.

In this embodiment, it is determined whether the first extended road is parallel to the second extended road. In a case that the first extended road is parallel to the second extended road, the first extended road is used as the target extended road corresponding to the intrinsic upper road, and the second extended road is used as the target extended road corresponding to the intrinsic lower road. The true extended roads of the intrinsic upper road and the intrinsic lower road are accurately determined by determining whether the extended roads are parallel to each other, so as to verify whether the mined extended roads are true and accurate.

In an embodiment, the updating module 1108 is further configured to: acquire a first number of thinned points from the second extended road, and determine, from the first number of thinned points, second thinned points allowed to be projected onto the first extended road; determine pedal distances between the second thinned points and the first extended road, and determine a number of the second thinned points at pedal distances satisfying a distance threshold; determine a road angle between the second extended road and the first extended road; and determine that the first extended road is parallel to the second extended road in a case that the number of the second thinned points at the pedal distances satisfying the distance threshold satisfies a number threshold and the road angle satisfies an angle threshold.

In this embodiment, the first number of thinned points are acquired from the second extended road, and the second thinned points in the first number of thinned points allowed to be projected onto the first extended road are determined, the pedal distances between the second thinned points and the first extended road are determined, the number of the second thinned points at the pedal distances satisfying the distance threshold are determined, and the road angle between the second extended road and the first extended road is determined. It is determined by using the three conditions whether the first extended road and the second extended road are parallel within a specific spatial distance. In a case that the number of the second thinned points at the pedal distances satisfying the distance threshold satisfies the number threshold and the road angle satisfies the angle threshold (that is to say, the three conditions are all satisfied), it is determined that the first extended road is parallel to the second extended road. Therefore, the accuracy and the reliability of the obtained results are ensured.

In an embodiment, the updating module 1108 is further configured to determine an angle between a polyline formed by the first number of thinned points and the first extended road, an extending direction of the polyline being same as an extending direction of the first extended road.

In this embodiment, the updating module 1108 is further configured to, in a case that the intrinsic upper road of the overpass corresponds to at least two first extended roads, determine whether the at least two first extended roads include a road parallel to the second extended road; in a case that the at least two first extended roads include the extended road parallel to the second extended road, use, as the target extended road corresponding to the intrinsic upper road, the first extended road parallel to the second extended road, and use the second extended road as the target extended road corresponding to the intrinsic lower road; and delete extended roads corresponding to the intrinsic upper road and the intrinsic lower road other than the target extended roads.

In this embodiment, in a case that the intrinsic upper road of the overpass corresponds to the at least two first extended roads, it is determined whether the at least two first extended roads include the road parallel to the second extended road, and in a case that the at least two first extended roads include the extended road parallel to the second extended road, the first extended road parallel to the second extended road is used as the target extended road corresponding to the intrinsic upper road, and the second extended road is used as the target extended road corresponding to the intrinsic lower road. In this way, the real extended road corresponding to the intrinsic upper road and the real extended road corresponding to the intrinsic lower road may be determined, and the accuracy of the target extended roads may be ensured.

In an embodiment, the apparatus further includes a path planning module. The path planning module is configured to perform path planning based on the updated electronic map.

In this embodiment, the upper road data and the lower road data of the overpass are added to the electronic map, such that the data of the electronic map is more complete, thereby providing more effective information for the path planning, and achieving more accurate path planning. In a case that the current position of the user is at the upper road or the lower road of the overpass, the terminal may remind the user in real time of a path length and a required time to the end node, and effectively determines whether the user deviates from the planned path, thereby improving the flexibility and the accuracy of the path planning.

The modules in the foregoing road updating apparatus for an electronic map may be implemented entirely or partially by software, hardware, or a combination thereof. The foregoing modules may be built in or independent of a processor of a computer device in a hardware form, or may be stored in a memory of the computer device in a software form, such that the processor invokes and performs an operation corresponding to each of the foregoing modules.

Figure 12:
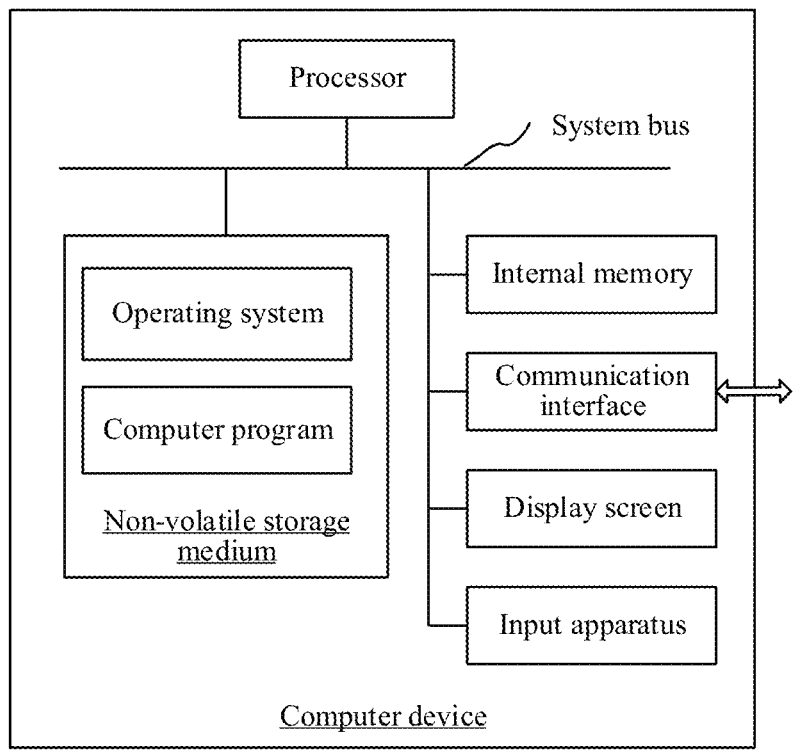
FIG. 12 is a diagram of an internal structure of a computer device according to an embodiment.

FIG. 12 is a diagram of an internal structure of a computer device according to an embodiment. In an embodiment, a computer device is provided. The computer device may be a terminal, and an internal structure diagram thereof may be shown in FIG. 12. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is used for wired or wireless communication with an external terminal. The wireless communication may be realized by Wi-Fi, an operator network, near field communication (NFC), or other technologies. The computer program is executed by the processor to implement a road updating method for an electronic map. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 12 is only a block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In an embodiment, a computer device is further provided, including a memory and a processor, the memory storing a computer program, the computer program, when executed by the processor, implementing the operations in the foregoing method embodiments.

In some embodiments, a computer-readable storage medium is provided, storing a computer program, the computer program, when executed by a processor, implementing the operations in the foregoing method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A road updating method for an electronic map, performed by at least one processor, the method comprising:
    loading electronic map data for an electronic map, from a nonvolatile data storage device;
    acquiring a target road in the electronic map, the target road being at least one of an intrinsic upper road of an overpass or an intrinsic lower road of the overpass;
    acquiring a target node of the target road, the target node being at least one of a first node of the target road or a last node of the target road;
    acquiring visible points within a preset range of the target node;
    determining path lengths between the visible points and the target node;
    determining an extended road of the target node according to the path lengths between the visible points and the target node; and
    updating the electronic map data in the nonvolatile data storage device based on the extended road.

2. The method of claim 1, wherein the determining the extended road of the target node according to the path lengths between the visible points and the target node comprises:
    determining a minimum value of the path lengths between the visible points and the target node; and
    using, as the extended road of the target node, a path corresponding to the minimum value that is between the visible points and the target node.

3. The method of claim 1, further comprising:
    determining a last node of the extended road;
    based on the last node of the extended road being a fork, determining a first road set forming the fork; and
    based on a determination that the first road set comprises a ramp road and the target road is not the ramp road, determining a next extended road based on an extending direction of the extended road.

4. The method of claim 1, wherein the target road is the intrinsic upper road of the overpass, and before the updating the electronic map based on the extended road, the method further comprises:
    based on the target road being a circular road and the last node of the extended road being a fork, determining a second road set forming the fork; and
    using a non-circular road in the second road set as a next extended road of the extended road.

5. The method of claim 1, wherein the target road is the intrinsic lower road of the overpass, and the acquiring the target node of the target road comprises:
    acquiring the intrinsic upper road corresponding to the intrinsic lower road of the overpass; and
    determining, based on a distance between the intrinsic upper road and the intrinsic lower road, a target node of the intrinsic lower road from which the intrinsic lower road extends.

6. The method of claim 5, wherein the determining, based on the distance between the intrinsic upper road and the intrinsic lower road, the target node of the intrinsic lower road from which the intrinsic lower road extends comprises:
    determining a first pedal distance between a first node of the intrinsic lower road of the overpass and the intrinsic upper road corresponding to the intrinsic lower road;
    determining a second pedal distance between a last node of the intrinsic lower road of the overpass and the intrinsic upper road; and
    based on at least one of the first pedal distance or the second pedal distance being less than or equal to a distance threshold, using, as the target node of the intrinsic lower road from which the intrinsic lower road extends, a node corresponding to a pedal distance, between the first pedal distance and the second pedal distance, that is less than or equal to the distance threshold.

7. The method of claim 6, wherein the determining, based on the distance between the intrinsic upper road and the intrinsic lower road, the target node of the intrinsic lower road from which the intrinsic lower road extends further comprises:
    based on the first pedal distance and the second pedal distance both being greater than the distance threshold, determining a minimum value of the first pedal distance and the second pedal distance; and
    using, as the target node of the intrinsic lower road from which the intrinsic lower road extends, a node corresponding to the minimum value.

8. The method of claim 1, wherein the updating comprises:
    acquiring a first extended road of the intrinsic upper road of the overpass and a second extended road of the intrinsic lower road of the overpass;
    verifying the first extended road and the second extended road;
    obtaining a target extended road corresponding to the intrinsic upper road and a target extended road corresponding to the intrinsic lower road; and
    obtaining an updated electronic map by updating the intrinsic upper road and the intrinsic lower road based on the target extended road corresponding to the intrinsic upper road and the target extended road corresponding to the intrinsic lower road, respectively.

9. The method of claim 8, wherein the verifying the first extended road and the second extended road comprises:
    determining whether the first extended road is parallel to the second extended road; and
    using the first extended road as the target extended road corresponding to the intrinsic upper road and using the second extended road as the target extended road corresponding to the intrinsic lower road based on the first extended road being parallel to the second extended road.

10. The method of claim 9, wherein the determining whether the first extended road is parallel to the second extended road comprises:
    acquiring a first number of thinned points from the second extended road;
    determining, from the first number of thinned points, second thinned points allowed to be projected onto the first extended road;
    determining pedal distances between the second thinned points and the first extended road;
    determining a number of the second thinned points at pedal distances satisfying a distance threshold;
    determining a road angle between the second extended road and the first extended road; and
    determining that the first extended road is parallel to the second extended road based on the number of the second thinned points at the pedal distances satisfying the distance threshold satisfying a number threshold and the road angle satisfying an angle threshold.

11. The method of claim 10, wherein the determining the road angle between the second extended road and the first extended road comprises:
    determining a road angle between a polyline formed by the first number of thinned points and the first extended road,
    wherein an extending direction of the polyline is the same as an extending direction of the first extended road.

12. The method of claim 8, wherein the verifying the first extended road and the second extended road comprises:
    based on the intrinsic upper road of the overpass corresponding to at least two first extended roads, determining whether the at least two first extended roads comprise a road parallel to the second extended road; and
    the at least two first extended roads comprising the extended road parallel to the second extended road:
    using, as the target extended road corresponding to the intrinsic upper road, the first extended road parallel to the second extended road, and
    using the second extended road as the target extended road corresponding to the intrinsic lower road.

13. The method of claim 12, further comprising:
    deleting extended roads corresponding to the intrinsic upper road and the intrinsic lower road other than the target extended road corresponding to the intrinsic upper road and the target extended road corresponding to the intrinsic lower road.

14. The method of claim 1, further comprising:
    performing path planning based on an updated electronic map.

15. An apparatus, comprising:
    at least one memory configured to store computer program code and electronic map data for an electronic map; and
    at least one processor configured to access said computer program code and operate as instructed by said computer program code, said computer program code comprising:
    loading electronic map data for the electronic map from the memory;
    first acquiring code configured to cause the at least one processor to acquire a target road in an electronic map, the target road being at least one of an intrinsic upper road of an overpass or an intrinsic lower road of the overpass;
    second acquiring code configured to cause the at least one processor to acquire a target node of the target road, the target node being at least one of a first node of the target road or a last node of the target road;
    third acquiring code configured to cause the at least one processor to acquire visible points within a preset range of the target node;
    first determining code configured to cause the at least one processor to determine path lengths between the visible points and the target node;
    second determining code configured to cause the at least one processor to determine an extended road of the target node according to the path lengths between the visible points and the target node; and
    first updating code configured to cause the at least one processor to update the electronic map data in the memory based on the extended road.

16. The apparatus of claim 15, wherein the second determining code is further configured to cause the at least one processor to:
    determine a minimum value of the path lengths between the visible points and the target node; and
    use, as the extended road of the target node, a path corresponding to the minimum value that is between the visible points and the target node.

17. The apparatus of claim 15, wherein the computer program code further comprises, for execution prior to execution of the first updating code:
    third determining code configured to cause the at least one processor to determine a last node of the extended road;
    fourth determining code configured to cause the at least one processor to, based on the last node of the extended road being a fork, determine a first road set forming the fork; and
    fifth determining code configured to cause the at least one processor to, based on a determination that the first road set comprises a ramp road and the target road is not the ramp road, determine a next extended road based on an extending direction of the extended road.

18. The apparatus of claim 15, wherein the target road is the intrinsic upper road of the overpass, and the computer program code further comprises, for execution prior to execution of the first updating code,
    sixth determining code configured to cause the at least one processor to, based on the target road being a circular road and the last node of the extended road being a fork, determine a second road set forming the fork; and
    first using code configured to cause the at least one processor to use a non-circular road in the second road set as a next extended road of the extended road.

19. The apparatus of claim 15, wherein the target road is the intrinsic lower road of the overpass, and the second acquiring code is further configured to cause the at least one processor to:
    acquire the intrinsic upper road corresponding to the intrinsic lower road of the overpass; and
    determine, based on a distance between the intrinsic upper road and the intrinsic lower road, a target node of the intrinsic lower road from which the intrinsic lower road extends.

20. A non-transitory computer-readable storage medium storing computer instructions that, when executed by at least one processor of a device, cause the at least one processor to:
    load electronic map data for an electronic map from a non-volatile storage device;
    acquire a target road in an electronic map, the target road being at least one of an intrinsic upper road of an overpass or an intrinsic lower road of the overpass;
    acquire a target node of the target road, the target node being at least one of a first node of the target road or a last node of the target road;
    acquire visible points within a preset range of the target node;
    determine path lengths between the visible points and the target node;
    determine an extended road of the target node according to the path lengths between the visible points and the target node; and
    update the electronic map data in the non-volatile storage device based on the extended road.

* * * * *